US012565187B2

(12) United States Patent
Song et al.

(10) Patent No.: US 12,565,187 B2
(45) Date of Patent: Mar. 3, 2026

(54) HYBRID ELECTRIC VEHICLE AND POWER CONTROL METHOD FOR SAME

(71) Applicants: HYUNDAI MOTOR COMPANY, Seoul (KR); KIA CORPORATION, Seoul (KR)

(72) Inventors: Han Nah Song, Daejeon (KR); Jae Young Choi, Seoul (KR); Min Gyun Jo, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 362 days.

(21) Appl. No.: 18/119,505

(22) Filed: Mar. 9, 2023

(65) Prior Publication Data

US 2024/0075919 A1     Mar. 7, 2024

(30) Foreign Application Priority Data

Sep. 2, 2022     (KR) ......................... 10-2022-0111601

(51) Int. Cl.
*G06F 19/00*          (2018.01)
*B60L 58/12*          (2019.01)
*B60W 10/06*          (2006.01)

(52) U.S. Cl.
CPC ............. *B60W 10/06* (2013.01); *B60L 58/12* (2019.02); *B60W 2510/083* (2013.01); *B60W 2510/244* (2013.01)

(58) Field of Classification Search
CPC ................. B60W 10/08; B60W 20/13; B60W 2510/244; B60W 2710/083; B60W 20/00;

B60K 6/387; B60K 2006/4825; B60Y 2200/92; F02N 11/04
USPC ......................................................... 701/101
See application file for complete search history.

(56) References Cited

U.S. PATENT DOCUMENTS

| | | | |
|---|---|---|---|
| 8,494,748 B2 | 7/2013 | Lee | |
| 10,358,124 B2 | 7/2019 | Kim | |
| 11,427,178 B2 | 8/2022 | Yonezawa et al. | |
| 2010/0004831 A1 | 1/2010 | Lee | |
| 2016/0375889 A1 | 12/2016 | Kim | |
| 2017/0253244 A1* | 9/2017 | Doan .............. | B60W 30/18036 |
| 2020/0298823 A1 | 9/2020 | Yonezawa et al. | |
| 2021/0129830 A1 | 5/2021 | Matsubara et al. | |
| 2021/0387610 A1* | 12/2021 | Jeong .................... | B60W 10/06 |
| 2022/0153253 A1* | 5/2022 | Nakashima .......... | B60W 10/02 |

(Continued)

FOREIGN PATENT DOCUMENTS

| | | |
|---|---|---|
| JP | 2017013583 A | 1/2017 |
| JP | 2020152251 A | 9/2020 |

(Continued)

*Primary Examiner* — Hung Q Nguyen
*Assistant Examiner* — James J Kim
(74) *Attorney, Agent, or Firm* — Lempia Summerfield Katz LLC

(57) ABSTRACT

Proposed are a hybrid electric vehicle and a power control method for the hybrid electric vehicle. The power control method includes: determining an engine load region of the vehicle, learning an actual torque of an engine based on the amount of power generated by at least one motor corresponding to the engine load region among a plurality of motors provided in the hybrid electric vehicle, and compensating engine modeling torque based on the actual torque of the engine learned through the motor.

18 Claims, 4 Drawing Sheets

(56)  References Cited

U.S. PATENT DOCUMENTS

| | | | |
|---|---|---|---|
| 2023/0083854 A1* | 3/2023 | Jaccoud | B60W 10/08 |
| | | | 701/22 |
| 2023/0204100 A1* | 6/2023 | Sano | F16H 61/0403 |

FOREIGN PATENT DOCUMENTS

| | | | |
|---|---|---|---|
| JP | 2022022790 A | 2/2022 |
| KR | 20100003392 A | 1/2010 |
| KR | 101694015 B1 | 1/2017 |
| KR | 20220089786 A | 6/2022 |

* cited by examiner

*100*

1

HYBRID ELECTRIC VEHICLE AND POWER CONTROL METHOD FOR SAME

CROSS REFERENCE TO RELATED APPLICATION

The present application claims priority to Korean Patent Application No. 10-2022-0111601, filed on Sep. 2, 2022, the entire contents of which are incorporated herein for all purposes by reference.

BACKGROUND

Field

The present disclosure relates to a hybrid electric vehicle having a first motor always connected to an engine and a second motor selectively connected to the engine. The present disclosure also relates to a power control method for the same. The method may correct engine modeling torque by using the first motor and the second motor.

Description of the Related Art

Recently, with growing interest in the environment, eco-friendly vehicles that have an electric motor as a power source are increasing. Eco-friendly vehicles are also referred to as electrified vehicles, and a representative example thereof is a hybrid electric vehicle (HEV) or an electric vehicle (EV).

Since such an electrified vehicle is provided with a motor different from a conventional internal combustion engine (ICE) vehicle, the electrified vehicle may obtain power required for propulsion using the motor. A hybrid electric vehicle that is driven with two power sources consisting of an engine and a motor can provide optimal power and torque depending on how the engine and the motor are harmoniously operated during driving of the vehicle.

In particular, in a hybrid electric vehicle that employs a parallel type (or transmission mounted electric drive (TMED) type) hybrid system in which a motor and an engine clutch (EC) are mounted between an engine and a transmission, power output from the engine and power output from the motor may be simultaneously transmitted to a drive shaft.

Meanwhile, when a hybrid electric vehicle is driven using an engine as a driving source, there is a problem that an error occurs between a command torque for the engine and an output torque depending on the specifications and durability of the engine. Also, there is another problem that such an error results in degradation of the accuracy of control in performing power control of the hybrid electric vehicle by using the torque.

The foregoing is intended merely to aid in the understanding of the background of the present disclosure and is not intended to mean that the present disclosure falls within the purview of the related art that is already known to those having ordinary skill in the art.

SUMMARY

Accordingly, the present disclosure has been made keeping in mind the above problems occurring in the related art. The present disclosure provides a hybrid electric vehicle having a first motor always or maintained to be connected to an engine and a second motor selectively connected to the engine and a power control method for the same. The method may correct engine modeling torque by learning an actual torque of the engine through the first motor and the second motor.

The objectives of the present disclosure are not limited to those mentioned above, and other objectives not mentioned will be clearly understood by those having ordinary skill in the art from the description provided hereinafter.

According to one aspect of the present disclosure, a power control method for a hybrid electric vehicle includes determining an engine load region of the vehicle; learning an actual torque of an engine based on the amount of power generated by at least one motor corresponding to the engine load region among a plurality of motors provided in the vehicle. The method also includes compensating engine modeling torque based on the actual torque of the engine learned through the motor.

For example, the determining of the engine load region of the vehicle may be performed when an accumulated mileage of the vehicle exceeds a reference mileage or a driver manipulates a command input device provided in the vehicle.

In another embodiment, the determining of the engine load region of the vehicle may include determining the engine load region as a first load region when the accumulated mileage of the vehicle exceeds a first reference mileage. The determining of the engine load region of the vehicle may also include determining the engine load region as a second load region with a load lower than a load of the first load region when the accumulated mileage of the vehicle exceeds a second reference mileage that is smaller than the first reference mileage.

In one embodiment, the learning of the actual torque of the engine may include learning the actual torque of the engine by using both a first motor always connected to the engine and a second motor selectively connected to the engine when the engine load region is a first load region.

In one embodiment, the first motor may be a motor located between the engine and an engine clutch, and a second motor may be a motor located between the engine clutch and a transmission.

In one embodiment, the learning of the actual torque of the engine may include learning the actual torque of the engine by using both the first motor and the second motor when the engine load region is the first load region, a transmission of the vehicle is in a park stage (P-stage), and a state of charge (SOC) of a battery is less than a reference SOC.

In one embodiment, the learning of the actual torque of the engine may further include learning the actual torque of the engine by using the first motor always connected to the engine when the engine load region is a second load region.

In one embodiment, the learning of the actual torque of the engine may include learning the actual torque of the engine by using the first motor when the engine load region is the second load region and a SOC of a battery is less than a reference SOC.

In one embodiment, the compensating of the engine modeling torque may include: determining an engine torque compensation amount based on the actual torque of the engine learned through the motor; and compensating the engine modeling torque based on the determined compensation amount.

In one embodiment, the engine torque compensation amount may correspond to a difference value between the learned actual torque of the engine and the engine modeling torque.

According to another aspect of the present disclosure, a hybrid electric vehicle includes: an engine; a first motor always connected to the engine; a second motor selectively connected to the engine; and a controller configured to determine an engine load region of the vehicle. The controller is also configured to learn an actual torque of the engine based on the amount of power generated by at least one motor corresponding to the engine load region among a plurality of motors provided in the vehicle. The controller is also configured to compensate engine modeling torque based on the actual torque of the engine learned through the motor.

In one embodiment, the controller may determine the engine load region when an accumulated mileage of the vehicle exceeds a reference mileage or a driver manipulates a command input device provided in the vehicle.

In one embodiment, the controller may determine the engine load region as a first load region when the accumulated mileage of the vehicle exceeds a first reference mileage. The controller may also determine the engine load region as a second load region with a load lower than a load of the first load region when the accumulated mileage of the vehicle exceeds a second reference mileage that is smaller than the first reference mileage.

In one embodiment, the controller may learn the actual torque of the engine by using both the first motor always connected to the engine and the second motor selectively connected to the engine when the engine load region is a first load region.

In one embodiment, the controller may learn the actual torque of the engine by using both the first motor and the second motor when the engine load region is the first load region, a transmission of the vehicle is in a P-stage, and a SOC of a battery is less than a reference SOC.

In one embodiment, the controller may learn the actual torque of the engine by using the first motor always connected to the engine when the engine load region is a second load region.

In one embodiment, the controller may learn the actual torque of the engine by using the first motor when the engine load region is the second load region and a SOC of a battery is less than a reference SOC.

In one embodiment, the controller may determine an engine torque compensation amount based on the actual torque of the engine learned through the motor and compensate the engine modeling torque based on the determined compensation amount.

According to the hybrid electric vehicle and the power control method for the same according to the present disclosure, by learning the actual torque of the engine through the first motor and the second motor and compensating engine modeling torque based on the learned actual torque of the engine, it is possible to reduce errors that occur when performing power control of the vehicle.

The effects of the present disclosure are not limited to those mentioned above, and other effects not mentioned should be clearly understood by those having ordinary skill in the art from the description provided hereinafter.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
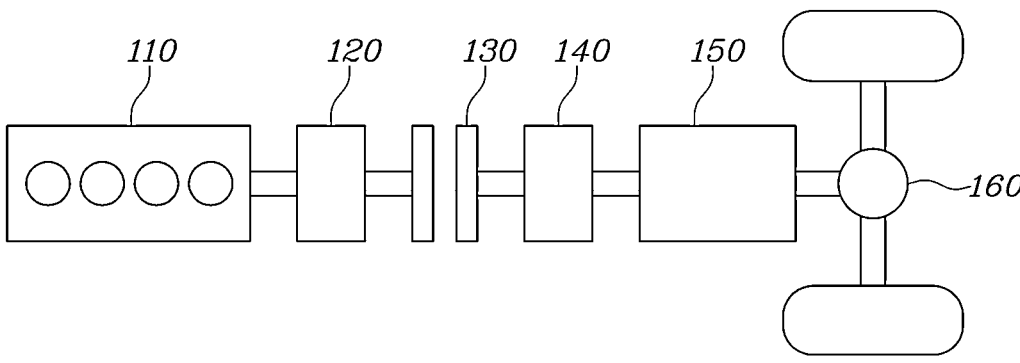
FIG. 1 is a schematic view illustrating an example of the configuration of a powertrain of a hybrid electric vehicle according to an embodiment of the present disclosure.

Hereinafter, embodiments disclosed in the present disclosure are described in detail with reference to the accompanying drawings, in which identical or similar constituent elements are given the same reference numerals regardless of the reference numerals of the drawings, and repeated description thereof has been omitted. The component suffixes "module" and "part" used in the following description are given or mixed together only for the ease of creating the specification and have no meanings or roles that are distinguished from each other by themselves. In the description of the present disclosure, when it is determined that the detailed description of the related art would obscure the gist of the present disclosure, the detailed description thereof is omitted. In addition, the accompanying drawings are merely intended to facilitate the understanding of the embodiments disclosed herein, and thus the technical idea disclosed herein is not limited by the accompanying drawings. It should be understood that all changes, equivalents, and substitutions should be included in the idea and technical scope of the present disclosure.

It should be understood that, although the terms "first", "second", etc., may be used herein to describe various elements, these elements should not be limited by these terms. These terms are only used to distinguish one element from another element.

It should be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly linked" to another element, there are no intervening elements present.

As used herein, the singular forms "a", "an", and "the" are intended to include the plural forms as well, unless the context clearly indicates otherwise.

It should be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

In addition, an expression "unit" or "control unit" included in a term, such as a motor control unit (MCU) or a hybrid control unit (HCU), is only a term widely used in the naming of a controller controlling a specific function of a vehicle. However, it should not be understood as a generic function unit. For example, each controller may include a communication device communicating with another controller or a sensor to control a corresponding function to which the controller is in charge; a memory storing an operating system (OS), logic commands, input/output information, and the like; and one or more processors performing determination, calculation, decision, and the like required for the control of the corresponding function. When a component, device, element, or the like of the present disclosure is described as having a purpose or performing an operation, function, or the like, the component, device, or element should be considered herein as being "configured to" meet that purpose or to perform that operation or function.

Prior to description of a power control method for a hybrid electric vehicle 100 according to embodiments of the present disclosure, the structure and control system of the hybrid electric vehicle 100 applicable to embodiments will be described.

FIG. 1 is a schematic view illustrating an example of the configuration of a powertrain of a hybrid electric vehicle 100 according to an embodiment of the present disclosure.

Referring to FIG. 1, a powertrain of the hybrid electric vehicle 100 employing a parallel type hybrid system in which two motors 120 and 140 and an engine clutch 130 are mounted between an internal combustion engine (ICE) 110 and a transmission 150 is illustrated. The parallel type hybrid system is also referred to as a transmission mounted electric drive (TMED) hybrid system because the motor 140 is always or maintained to be connected to an input end of the transmission 150.

Here, the first motor 120 of the two motors 120 and 140 is disposed between the engine 110 and a first end of the engine clutch 130. An engine shaft of the engine 110 and a first motor shaft of the first motor 120 may be directly connected to each other to be always rotated in conjunction with each other.

A first end of a second motor shaft of the second motor 140 may be connected to a second end of the engine clutch 130, and a second end of the second motor shaft may be connected to the input end of the transmission 150.

The second motor 140 may have a greater power than the first motor 120. The second motor 140 may serve as a driving motor. In addition, the first motor 120 may serve as a starter motor for cranking the engine 110 when the engine 110 is on, may recover the rotational energy of the engine 110 through power generation when the engine is off, and may perform power generation with power of the engine 110 while the engine 110 is running.

In the hybrid electric vehicle 100 having the powertrain as illustrated in FIG. 1, when a driver depresses an accelerator pedal after ignition-on (e.g., hybrid electric vehicle (HEV) Ready), the second motor 140 is driven first with power from a battery (not illustrated) in a situation in which the engine clutch 130 is opened. Then, the power from the second motor 140 is transmitted to wheels through the transmission 150 and a final drive (FD) 160 so as to drive the wheels (i.e., an electric vehicle (EV) mode). When greater driving force is required in response to gradual acceleration of the vehicle, the engine 110 may be cranked by operating the first motor 120.

Consequently, when the error in the number of revolutions between the engine 110 and the second motor 140 is within a predetermined range, the engine clutch 130 is engaged to connect the engine 110 and the second motor 140. Thus, the engine 110 and the second motor 140 may be allowed to be rotated in conjunction with each other (i.e., transition from the EV mode to an HEV mode). Accordingly, power output from the second motor 140 may be lowered and power output from the engine 110 may be increased through a torque blending process. Thus, a driver's required torque may be satisfied. In the HEV mode, the engine 110 may satisfy most of the required torque, and the error between an engine torque and the required torque may be compensated through at least one of the first motor 120 or the second motor 140. For example, when the engine 110 outputs a torque greater than the required torque in consideration of the efficiency of the engine 110, the first motor 120 or the second motor 140 may generate power in an amount corresponding to the surplus of the engine torque. On the other hand, when the engine torque is less than the required torque, at least one of the first motor 120 or the second motor 140 may output torque in an amount corresponding to the deficiency of the engine torque.

When a predetermined engine off condition is satisfied, for example, the vehicle is decelerated, the engine clutch 130 is opened and the engine 110 is stopped (i.e., transition from the HEV mode to the EV mode). At this time, the vehicle charges the battery (not illustrated) with electricity generated by the second motor 140 using driving force of the wheels. This is referred to as braking energy regeneration or regenerative braking.

In general, the transmission 150 may be a stepped transmission or a multi-plate clutch, e.g., a dual clutch transmission (DCT).

Figure 2:
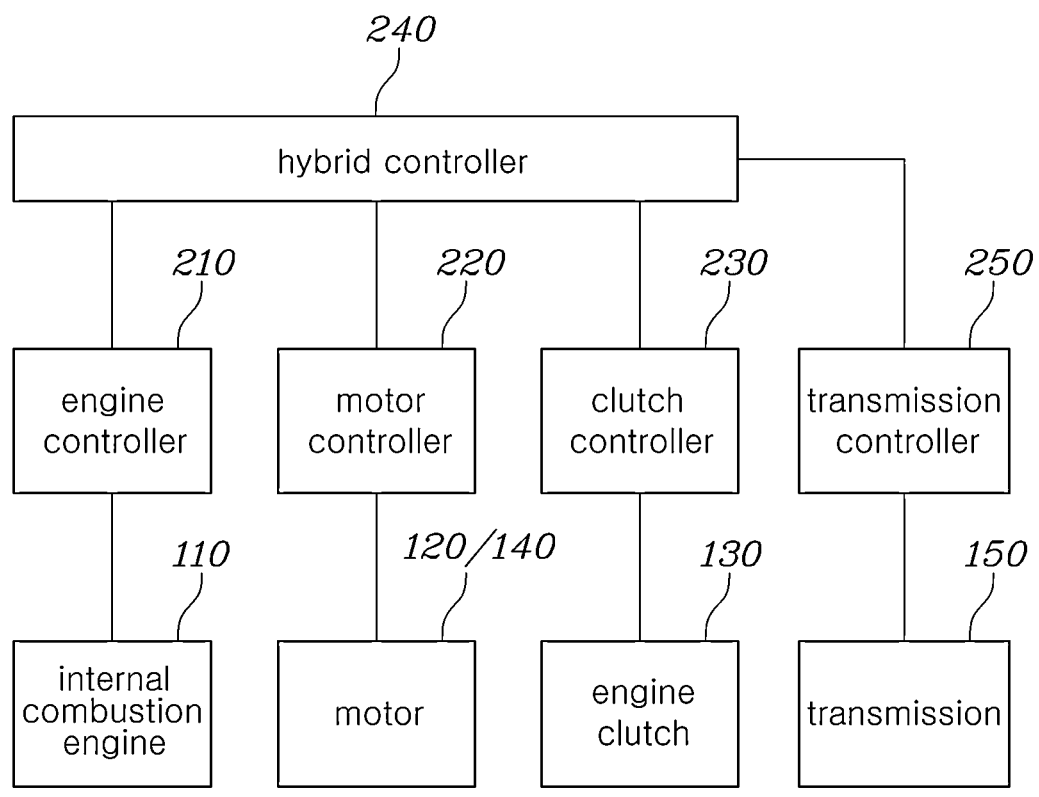
FIG. 2 is a block diagram illustrating an example of the configuration of a control system of the hybrid electric vehicle according to the embodiment of the present disclosure.

FIG. 2 is a block diagram illustrating an example of the configuration of a control system of the hybrid electric vehicle 100 according to the embodiment of the present disclosure.

Referring to FIG. 2, in the hybrid electric vehicle 100, the internal combustion engine 110 may be controlled by an engine controller 210, the torque of each of the first motor 120 and the second motor 140 may be controlled by a motor controller 220, e.g., a motor control unit (MCU), and the engine clutch 130 may be controlled by a clutch controller 230. Here, the engine controller 210 is also referred to as an engine management system (EMS). In addition, the transmission 150 may be controlled by a transmission controller 250.

The motor controller 220 may control a gate drive unit (not illustrated) with a pulse width modulation (PWM) control signal based on a motor angle, a phase voltage, a phase current, a required torque, and the like of each of the motors 120 and 140. The gate drive unit may control an inverter (not illustrated) that drives each of the motors 120 and 140 in response to the control signal.

Each of the controllers may be connected to a hybrid controller 240, e.g., a hybrid controller unit (HCU), controlling the overall powertrain including a mode switching process as a higher-level controller. Under the control of the hybrid controller 240, each of the controllers may provide at least one of information required for engine clutch control during gear shifting and changing of the driving mode and/or information required for engine stop control to the hybrid controller 240. Alternatively, each of the controllers may perform an operation in response to a control signal.

For example, the hybrid controller 240 may determine whether to perform switching between the EV mode and the HEV mode or between a charge depleting (CD) mode and charge sustaining (CS) mode (in the case of a plug-in hybrid electric vehicle (PHEV)). In this regard, the hybrid controller 240 may determine a point in time at which the engine clutch 130 is to be opened and perform hydraulic control when the engine clutch 130 is opened. In addition, the hybrid controller 240 may determine the state of the engine clutch 130 (e.g., the engine clutch 130 being locked-up, slipping, or opened) and may control a point in time at which the injection of fuel to the engine 110 is to be stopped. Further-more, the hybrid controller 240 may control the recovery of the rotational energy of the engine 110 by transmitting a torque command for controlling the torque of the first motor 120 for the engine stop control to the motor controller 220. In addition, in order to satisfy the required torque, the hybrid controller 240 may determine the state of each driving source 110, 120, 140 to determine a required driving force to be shared by each driving source 110, 120, 140 and may transmit a torque command to the controllers 210 and 220 that control each driving source 110, 120, 140.

It should be apparent to those having ordinary skill in the art that the connection relationship between and the functions/classification of the above-described controllers are illustrative, and the controllers are not limited to the names thereof. For example, the hybrid controller 240 may be configured such that the function of the hybrid controller 240 is replaced by one of other controllers or distributed to two or more of the other controllers.

The above-described configurations illustrated in FIGS. 1 and 2 are only example configurations of the hybrid electric vehicle 100, and it should be apparent to those having ordinary skill in the art that the hybrid electric vehicle 100 applicable to embodiments of the present disclosure is not limited to those configurations.

Meanwhile, in the engine 110 of the hybrid electric vehicle 100, when a command torque required by the driver for driving the vehicle is transmitted to the engine 110, the engine controller (EMS) 210 may control the engine 110 to output torque in an amount corresponding to the command torque based on the input command torque. Here, the torque that is expected to be output from the engine 110 under control of the engine controller 210 may be referred to as a modeling torque. In addition, the torque that the engine 110 actually generates by receiving an output from the engine controller 210 may be referred to as an actual torque or a measured torque of the engine 110. In other words, when the driver inputs the command torque, the engine controller 210 may control the engine 110 to start by inputting the modeling torque to the engine 110 in order to satisfy the command torque, and the engine 110 may output the actual torque based on the received modeling torque.

However, in such a series of processes, an error may occur between the command torque and the modeling torque or between the modeling torque and the actual torque. Thus, in an attempt to reduce the error between the command torque and the modeling torque or the modeling torque and the actual torque, the engine 110 was subjected to a single test before being mounted on the vehicle. However, an error tolerance may exist due to the characteristics of the engine 110 and the engine controller 210. For example, when the error tolerance between the command torque and the modeling torque and between the modeling torque and the actual torque is 5 N, a maximum error tolerance of 10 N may occur between the command torque and the actual torque. This may lead to a problem that the engine 110 does not sufficiently satisfy the torque required by the driver.

Conventionally, an attempt was made to reduce the error by providing a compensation logic between the command torque and the modeling torque inside the engine controller 210. However, since this is only a compensation logic between the command torque and the modeling torque, there is a problem that an error still occurs between the command torque or the modeling torque and the actual torque of the engine 110. In order to solve this, there may be considered a method of measuring the actual torque of the engine 110 and reducing the error occurring between the command torque or the modeling torque and the actual torque of the engine 110 based on the measured actual torque of the engine 110. However, it is difficult to measure the actual torque of the engine 110 due to the absence of a sensor for measuring the torque of the engine 110.

The torque of the engine 110 may be transmitted to the first motor 120 connected thereto and may be transmitted to the first motor 120 and the second motor 140 through the engine clutch 130 connected to the first and second motors 120 and 140. In other words, even when the actual torque of the engine 110 is not directly measured, the actual torque of the engine 110 may be estimated by measuring the torque or the amount of power transmitted to each of the first motor 120 and the second motor 140.

In one embodiment of the present disclosure, a proposed method may determine an engine load region of the vehicle, learn the actual torque of the engine 110 based on the amount of power generated by at least one motor corresponding to the engine load region among the motors 120 and 140 provided in the vehicle, and compensate the modeling torque of the engine 110 for the corresponding load region based on the learned actual torque of the engine 110. The configuration of a controller 300 for learning the actual torque of the engine 110 and compensating the modeling torque based on the learned actual torque is described with reference to FIG. 3.

Figure 3:
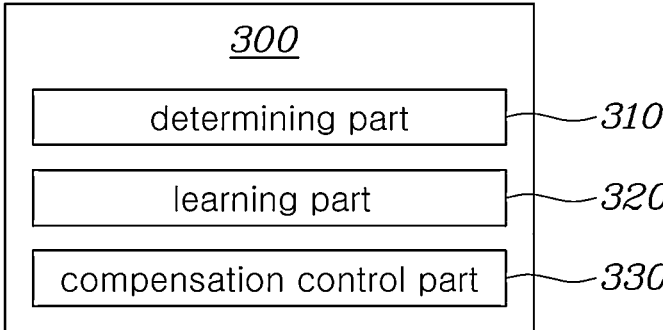
FIG. 3 is a block diagram illustrating a controller performing power control of the hybrid electric vehicle according to the embodiment of the present disclosure.

FIG. 3 is a block diagram illustrating the controller 300 performing power control of the hybrid electric vehicle 100 according to the embodiment of the present disclosure.

Referring to FIG. 3, the controller 300 according to the embodiment of the present disclosure may determine an engine load region of the vehicle, learn an actual torque of the engine 110 based on the amount of power generated by at least one motor, corresponding to the engine load region, of the motors 120 and 140 provided in the vehicle, and compensate engine modeling torque based on the actual torque of the engine 110 learned through the motor. To this end, the controller 300 may include a determining part 310, a learning part 320, and a compensation control part 330.

Specifically, the determining part 310 may determine the engine load region of the vehicle. For example, the engine load region of the vehicle may be divided into a first load region and a second load region with a load lower than a load of the first load region. However, this is exemplary, and the load region of the engine 110 is not limited to the first load region and the second load region and may include a plurality of regions other than the first load region and the second load region. The determining part 310 may determine which load region a current engine load region of the vehicle corresponds to among the first load region and the second load region. In particular, the determining part 310 may determine the engine load region when an accumulated mileage of the vehicle exceeds a reference mileage or the driver manipulates a command input device provided in the vehicle. However, each of the load regions may be within the maximum allowable torque range of the motor corresponding to the load region. For example, the second load region corresponding to a lower load than the first load region may be set in a torque range within the maximum allowable torque of the first motor 120.

The learning part 320 may learn the actual torque of the engine 110 in accordance with the engine load region determined by the determining part 310. In particular, the learning part 320 may learn the actual torque of the engine 110 by using any one or more of the plurality of motors 120 and 140 provided in the vehicle in accordance with the engine load region. For example, when the engine load region is the first load region, the learning part 320 may learn the actual torque of the engine 110 by using both the first motor 120 and the second motor 140. On the other hand, when the engine load region is the second load region, the learning part 320 may learn the actual torque of the engine 110 by using the first motor 120. Therefore, the actual torque of the engine 110 may mean a torque corresponding to the amount of power generated by one or more of the plurality of motors 120 and 140 or a torque corresponding to the amount of charge charged to the battery (not illustrated) when the battery (not illustrated) is charged using any one or more of the plurality of motors 120 and 140. In the present disclosure, as one embodiment, the learning part 320 may learn the torque, which corresponds to the amount of charge charged to the battery (not illustrated) when the battery (not illustrated) is charged using any one or more of the plurality of motors 120 and 140, as the actual torque of the engine 110.

The compensation control part 330 may derive a compensation value of the engine modeling torque based on the actual torque of the engine 110 learned by the learning part 320. Specifically, the compensation control part 330 may derive a difference between the actual torque of the engine 110 learned through the motor in accordance with each of the load regions and the engine modeling torque preset in the engine controller 210 as the compensation value of the engine modeling torque. The engine modeling torque may mean a torque expected to be output from the engine 110 by a command sent from the engine controller 210 to the engine 110 when a driver's required output is input in each of the load regions. Accordingly, the compensation control part 330 may determine the difference between the actual torque of the engine 110 and the torque expected to be output and provide the compensation value to the engine controller 210 to compensate the engine modeling torque preset in the engine controller 210 by the difference.

Figure 4:
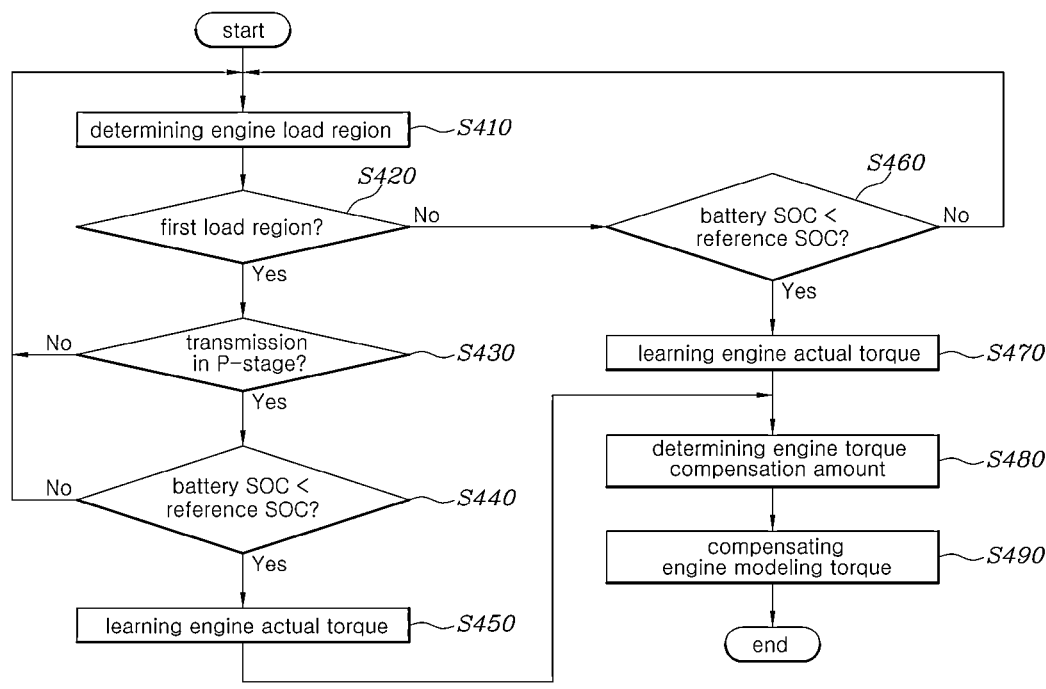
FIG. 4 is a flowchart illustrating a power control method for a hybrid electric vehicle according to an embodiment of the present disclosure.

Hereinafter, a power control method for a hybrid electric vehicle 100 according to an embodiment based on the configuration of the hybrid electric vehicle 100 described above with reference to FIGS. 1-3 is described with reference to FIG. 4. In FIG. 4, for convenience of description, it is assumed that the controller 300 illustrated in FIG. 3 is implemented as the hybrid controller (HCU) 240. The hybrid controller 240 may transmit the compensation value of the engine modeling torque derived from the compensation control part 330 illustrated in FIG. 3 to the engine controller (EMS) 210. Accordingly, since the engine controller 210 compensates the engine modeling torque that has already existed by the compensation value, it is possible to reduce errors and increase accuracy in vehicle control using the engine torque. However, this is exemplary, and the control between the engine controller 210 and the hybrid controller 240 is not limited to the method mentioned in the present disclosure.

FIG. 4 is a flowchart illustrating the power control method for the hybrid electric vehicle 100 according to the embodiment of the present disclosure.

First, referring to FIG. 4, the hybrid controller 240 may determine an engine load region of the vehicle (S410). For example, determining of the engine load region of the vehicle may be performed by the hybrid controller 240 when an accumulated mileage of the vehicle exceeds a reference mileage or the driver manipulates a command input device provided in the vehicle.

In determining the engine load region of the vehicle based on the accumulated mileage of the vehicle, the hybrid controller 240 may determine the engine load region as a first load region when the accumulated mileage of the vehicle exceeds a first reference mileage. In addition, the hybrid controller 240 may determine the engine load region as a second load region with a load lower than a load of the first load region when the accumulated mileage of the vehicle exceeds a second reference mileage that is smaller than the first reference mileage. When the driver manipulates the command input device provided in the vehicle, the hybrid controller 240 may determine the engine load region as the first load region or the second load region in accordance with a single signal or a combination of signals of the command input device. However, this is exemplary, and the present disclosure is not limited to the method mentioned above.

When the determined engine load region is the first load region (Yes in S420), the hybrid controller 240 may determine whether prerequisite conditions for performing learning in the first load region are satisfied (S430 and S440).

Specifically, since the first load region uses the first motor 120 and the second motor 140 together, the engine clutch 130 needs to be engaged, and it is desirable that the vehicle is stopped for engine torque control for learning. When the engine clutch 130 is engaged, the torque of the engine 110 may be transmitted not only to the first motor 120 and the second motor 140, but also to a final drive (FD) 160 connected to a rear end of the transmission 150 or a motor (not illustrated) connected to the wheels. In this case, an error may occur in learning the actual torque of the engine 110 using the first motor 120 and the second motor 140. Thus, accuracy may be reduced. Accordingly, it is desirable that the transmission 150 is in a park stage (P-stage).

In addition, energy may be generated as the first motor 120 and the second motor 140 generate power in the first load region, and the generated energy may be used to charge a battery (not illustrated) provided in the vehicle. Therefore, since the first motor 120 and the second motor 140 have to perform power generation, it is desirable that the battery (not illustrated) is in a chargeable state, i.e., a state of charge (SOC) of the battery (not illustrated) is less than a reference SOC.

Accordingly, the hybrid controller 240 may check whether the transmission 150 is in the P-stage (S430) and check whether the SOC of the battery (not illustrated) is less than the reference SOC (S440). When the prerequisite conditions are satisfied (Yes in S430 and Yes in S440), the hybrid controller 240 may perform learning of the actual torque of the engine 110 in the first load region (S450). Since the learning of the actual torque of the engine 110 has been described in the learning part 320 in FIG. 3, repeated description thereof has been omitted.

On the other hand, when the determined engine load region is the second load region (No in S412), the hybrid controller 240 may determine whether a prerequisite condition for performing learning in the second load region is satisfied (S460).

In the second load region, the engine clutch 130 is not engaged and the torque of the engine 110 is transmitted only to the first motor 120, so that it is not necessary to check whether the transmission 150 is in the P-stage. In other words, in the second load region, when the torque of the engine 110 falls within an allowable torque range of the first motor 120, this may mean that the learning is possible even while the vehicle is driven. However, energy may be generated as the first motor 120 generates power in the second load region, and the generated energy may be used to charge the battery (not illustrated) as described above in describing the first load region. Accordingly, the hybrid controller 240 may perform the learning in the second load region by checking whether the SOC of the battery (not illustrated) is less than the reference SOC (S460).

When the SOC of the battery (not illustrated) is less than the reference SOC (Yes in S460), the hybrid controller 240 may perform the learning of the actual torque of the engine 110 in the second load region (S470).

Thereafter, the hybrid controller 240 may determine an engine torque compensation amount as the learning of the actual torque of the engine 110 in the first load region or the second load region is performed (S480). For example, in the case of the first load region, a difference between the actual torque of the engine 110 corresponding to the amount of charge charged to the battery (not illustrated) when the battery (not illustrated) is charged by driving the first motor 120 and the second motor 140 together and engine modeling torque preset in the engine controller 210 may be calculated, and the difference may be determined as the engine torque compensation amount. In addition, in the case of the second load region, a difference between the actual torque of the engine 110 corresponding to the amount of charge charged to the battery (not illustrated) when the battery (not illustrated) is charged by driving the first motor 120 and the engine modeling torque preset in the engine controller 210 may be calculated and determined as the engine torque compensation amount.

The hybrid controller 240 may transmit the determined engine torque compensation amount to the engine controller 210, and the engine controller 210 may compensate the engine modeling torque commanded to the engine 110 based on the engine torque compensation amount transmitted from the hybrid controller 240 (S490). Specifically, the engine controller 210 may compensate the engine modeling torque by reflecting the engine torque compensation amount to the preset engine modeling torque. Therefore, it is possible to reduce an error between the engine modeling torque and the actual torque of the engine 110, and it is possible to increase accuracy in controlling the engine torque according to the power required for the vehicle.

Although the prerequisite steps (S430 and S440) for learning the actual torque of the engine 110 in the first load region are sequentially illustrated in FIG. 4, the two steps do not necessarily have a precedence relationship but correspond to conditions that needs to be satisfied simultaneously to enter the learning step (S450). Accordingly, the illustrated in FIG. 4 is merely one embodiment of the present disclosure, and thus the order of the two steps may be changed or performed simultaneously.

Although specific embodiments of the present disclosure have been described for illustrative purposes, those having ordinary skill in the art should appreciate that various modifications, additions, and substitutions are possible, without departing from the scope and spirit of the disclosure as disclosed in the appended claims.

The present disclosure described above can be implemented in a program recorded medium as computer-readable codes. The computer-readable media include all kinds of recording devices in which data readable by a computer system are stored, such as hard disk drive (HDD), solid state disk (SSD), silicon disk drive (SDD), ROM, RAM, CD-ROM, magnetic tapes, floppy disks, optical data storage devices, and the like. The above embodiments are therefore to be construed in all aspects as illustrative and not restrictive. The scope of the disclosure should be determined by the appended claims and their legal equivalents and all changes coming within the meaning and equivalency range of the appended claims are intended to be embraced therein.

What is claimed is:

1. A power control method for a hybrid electric vehicle, the power control method comprising:
   determining an engine load region of the hybrid electric vehicle;
   controlling an engine to output an actual torque corresponding to an engine modeling torque;
   learning the actual torque of the engine based on an amount of power generated by at least one motor corresponding to the engine load region among a plurality of motors provided in the hybrid electric vehicle; and
   compensating the engine modeling torque based on the learned actual torque of the engine.

2. The power control method of claim 1, wherein determining the engine load region of the hybrid electric vehicle is performed when an accumulated mileage of the hybrid electric vehicle exceeds a reference mileage or a driver manipulates a command input device provided in the hybrid electric vehicle.

3. The power control method of claim 2, wherein determining the engine load region of the hybrid electric vehicle comprises:
   determining the engine load region as a first load region when the accumulated mileage of the hybrid electric vehicle exceeds a first reference mileage; and
   determining the engine load region as a second load region with a load lower than a load of the first load region when the accumulated mileage of the hybrid electric vehicle exceeds a second reference mileage that is smaller than the first reference mileage.

4. The power control method of claim 1, wherein learning the actual torque of the engine comprises:
   learning the actual torque of the engine by using both a first motor maintained to be connected to the engine and a second motor selectively connected to the engine when the engine load region is a first load region.

5. The power control method of claim 4, wherein the first motor is a motor located between the engine and an engine clutch, and a second motor is a motor located between the engine clutch and a transmission.

6. The power control method of claim 4, wherein learning the actual torque of the engine comprises:
   learning the actual torque of the engine by using both the first motor and the second motor when the engine load region is the first load region, a transmission of the hybrid electric vehicle is in a park stage (P-stage), and a state of charge (SOC) of a battery is less than a reference SOC.

7. The power control method of claim 1, wherein learning the actual torque of the engine further comprises:
   learning the actual torque of the engine by using a first motor maintained to be connected to the engine when the engine load region is a second load region.

8. The power control method of claim 7, wherein learning the actual torque of the engine comprises:
   learning the actual torque of the engine by using the first motor when the engine load region is the second load region and a state of charge (SOC) of a battery is less than a reference SOC.

9. The power control method of claim 1, wherein compensating the engine modeling torque comprises:
   determining an engine torque compensation amount based on the learned actual torque of the engine; and
   compensating the engine modeling torque based on the determined compensation amount.

10. The power control method of claim 9, wherein the engine torque compensation amount corresponds to a difference value between the learned actual torque of the engine and the engine modeling torque.

11. A hybrid electric vehicle comprising:

an engine;

a first motor maintained to be connected to the engine;

a second motor selectively connected to the engine; and a controller configured to:

determine an engine load region of the hybrid electric vehicle, control the engine to output an actual torque corresponding to an engine modeling torque, learn the actual torque of the engine based on an amount of power generated by at least one motor corresponding to the engine load region among a plurality of motors provided in the hybrid electric vehicle, and compensate the engine modeling torque based on the learned actual torque of the engine.

12. The hybrid electric vehicle of claim 11, wherein the controller is further configured to determine the engine load region when an accumulated mileage of the hybrid electric vehicle exceeds a reference mileage or a driver manipulates a command input device provided in the hybrid electric vehicle.

13. The hybrid electric vehicle of claim 12, wherein the controller is further configured to determine the engine load region as a first load region when the accumulated mileage of the hybrid electric vehicle exceeds a first reference mileage, and the controller is further configured to determine the engine load region as a second load region with a load lower than a load of the first load region when the accumulated mileage of the hybrid electric vehicle exceeds a second reference mileage that is smaller than the first reference mileage.

14. The hybrid electric vehicle of claim 11, wherein the controller is further configured to learn the actual torque of the engine by using both the first motor maintained to be connected to the engine and the second motor selectively connected to the engine when the engine load region is a first load region.

15. The hybrid electric vehicle of claim 14, wherein the controller is further configured to learn the actual torque of the engine by using both the first motor and the second motor when the engine load region is the first load region, a transmission of the hybrid electric vehicle is in a park stage (P-stage), and a state of charge (SOC) of a battery is less than a reference SOC.

16. The hybrid electric vehicle of claim 11, wherein the controller is further configured to learn the actual torque of the engine by using the first motor maintained to be connected to the engine when the engine load region is a second load region.

17. The hybrid electric vehicle of claim 16, wherein the controller is further configured to learn the actual torque of the engine by using the first motor when the engine load region is the second load region and a SOC of a battery is less than a reference SOC.

18. The hybrid electric vehicle of claim 11, wherein the controller is further configured to determine an engine torque compensation amount based on the learned actual torque of the engine, and the controller is further configured to compensate the engine modeling torque based on the determined compensation amount.

* * * * *